(12) United States Patent
Sakurai et al.

(10) Patent No.: US 12,086,673 B2
(45) Date of Patent: Sep. 10, 2024

(54) WIRELESS TAG READING APPARATUS

(71) Applicant: Toshiba Tec Kabushiki Kaisha, Tokyo (JP)

(72) Inventors: Wataru Sakurai, Izu Shizuoka (JP); Nobuo Murofushi, Susono Shizuoka (JP); Shigeaki Suzuki, Gotemba Shizuoka (JP); Yuki Suzuki, Izunokuni Shizuoka (JP); Masaki Kimura, Izunokuni Shizuoka (JP); Yuichiro Kawabe, Mishima Shizuoka (JP); Haruka Otake, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/362,932

(22) Filed: Jul. 31, 2023

(65) Prior Publication Data

US 2024/0095474 A1    Mar. 21, 2024

(30) Foreign Application Priority Data

Sep. 20, 2022 (JP) ................. 2022-149402

(51) Int. Cl.
*G06K 7/10* (2006.01)
(52) U.S. Cl.
CPC ............... *G06K 7/10316* (2013.01)

(58) Field of Classification Search
CPC .. G06K 7/10; G06K 7/10297; G06K 7/10316; G06K 7/10366; G06K 7/10367
See application file for complete search history.

(56) References Cited

U.S. PATENT DOCUMENTS

| 2019/0180063 | A1 | 6/2019 | Suzuki |
| 2020/0143121 | A1* | 5/2020 | Sakurai ................. G07G 1/009 |

FOREIGN PATENT DOCUMENTS

| JP | 2009-163359 A | 7/2009 |
| JP | 7007170 B2 | 1/2022 |

* cited by examiner

*Primary Examiner* — Laura A Gudorf
(74) *Attorney, Agent, or Firm* — Kim & Stewart LLP

(57) ABSTRACT

A wireless tag reading apparatus for reading tag information stored in a wireless tag attached to an item, includes a stage on which the item can be placed, one or more antennas movable between first and second positions, a camera facing the stage, and a controller configured to control the camera to capture images and detect an object therein, control the antennas to transmit radio waves to a wireless tag and move the antennas, wherein the transmitting and the moving are repeated while the antennas move from the first position to the second position during a tag reading period, acquire tag information from response waves transmitted by the wireless tag in response to the radio waves, based on the captured images, determine whether the object has moved during the tag reading period, and upon determining that the object has moved during the tag reading period, issue a notification.

20 Claims, 10 Drawing Sheets

WIRELESS TAG READING APPARATUS

CROSS-REFERENCE TO RELATED APPLICATION(S)

This application is based upon and claims the benefit of priority from Japanese Patent Application No. 2022-149402, filed Sep. 20, 2022, the entire contents of which are incorporated herein by reference.

FIELD

Embodiments described herein relate generally to a wireless tag reading apparatus, a method carried out by a wireless tag reading apparatus, and a non-transitory computer readable medium.

BACKGROUND

A wireless tag reading apparatus that reads information from a wireless tag attached to an item stored in a basket is known.

In such a wireless tag reading apparatus, if an item or a basket containing the item is moved while the wireless tag attached to the item is being read, the information may be read incorrectly. Further, when a person moves around the wireless tag reading apparatus, the radio wave environment changes, and thus there is a possibility that the reading result of the wireless tag may be affected.

SUMMARY OF THE INVENTION

Embodiments of the present invention provide a wireless tag reading apparatus capable of outputting a notification when there is an external factor affecting reading of the wireless tag attached to an item.

In one embodiment, a wireless tag reading apparatus for reading tag information stored in a wireless tag attached to an item, includes a stage on which the item can be placed, one or more antennas movable between first and second positions, a camera facing the stage, and a controller configured to control the camera to capture images and detect an object therein, control the antennas to transmit radio waves to a wireless tag and move the antennas, wherein the transmitting and the moving are repeated while the antennas move from the first position to the second position during a tag reading period, acquire tag information from response waves transmitted by the wireless tag in response to the radio waves, based on the captured images, determine whether the object has moved during the tag reading period, and upon determining that the object has moved during the tag reading period, issue a notification.

DETAILED DESCRIPTION

Embodiments of the present invention applied to a wireless tag reading apparatus 10 will be described with reference to the drawings.

(Schematic Configuration of Wireless Tag Reading Apparatus)

Figure 1:
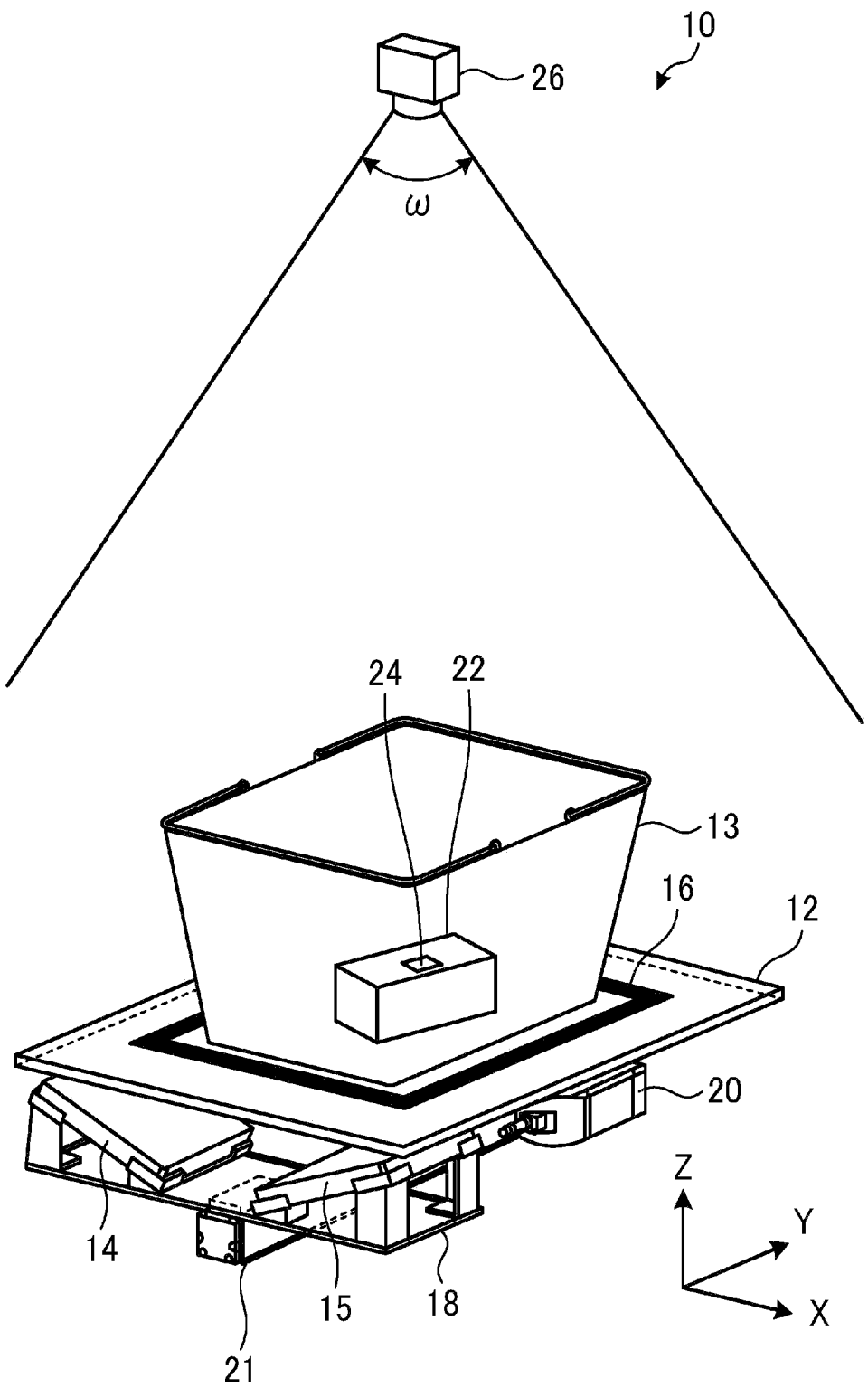
FIG. 1 is an external perspective view of a wireless tag reading apparatus according to an embodiment.
Figure 2:
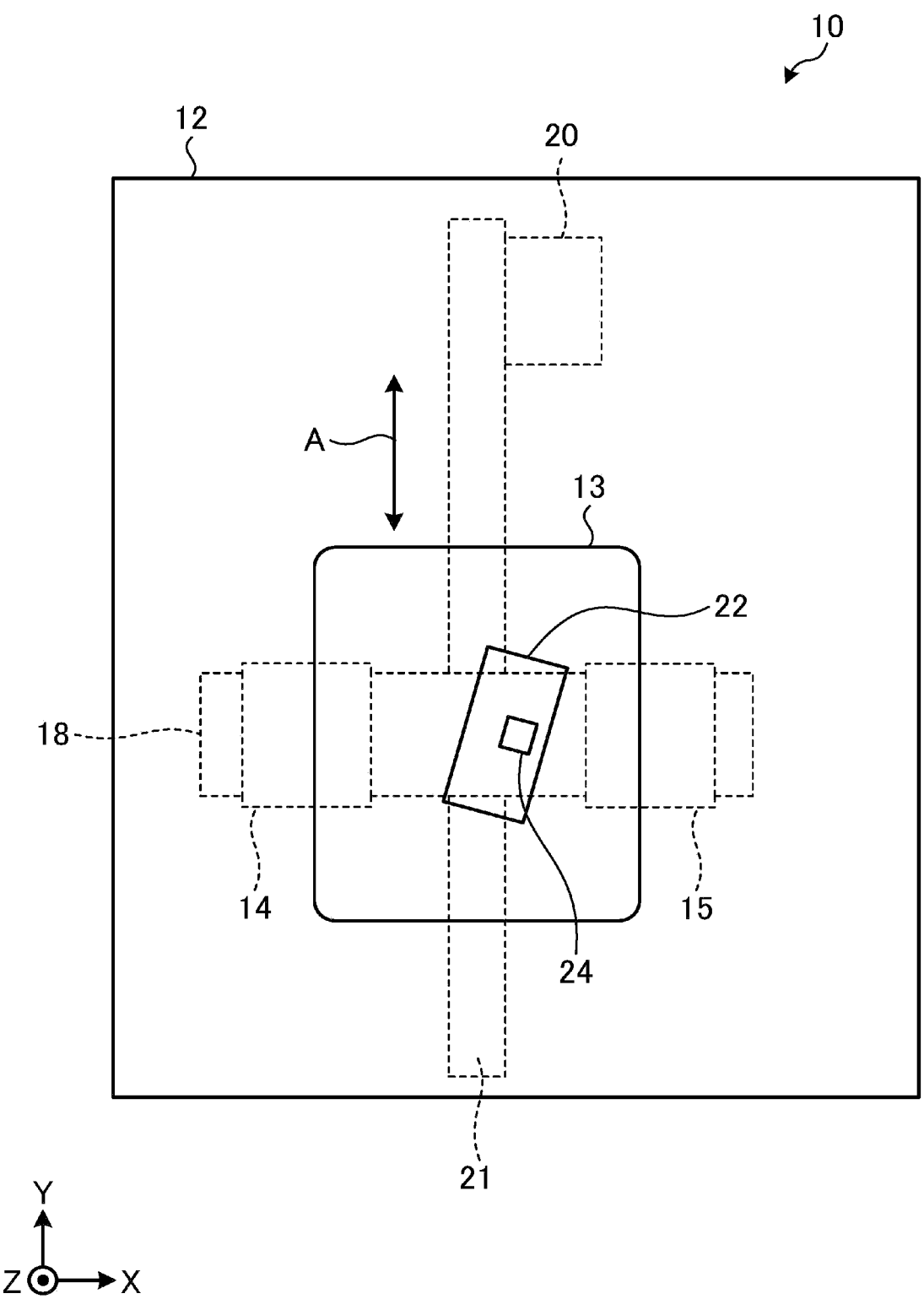
FIG. 2 is a top view of the wireless tag reading apparatus.

A schematic configuration of the wireless tag reading apparatus 10 will be described with reference to FIGS. 1 and 2. FIG. 1 is an external perspective view illustrating an example of the wireless tag reading apparatus 10 according to an embodiment. FIG. 2 is a top view of an antenna of the wireless tag reading apparatus according to an embodiment.

The wireless tag reading apparatus 10 is installed in, for example, a self-service registration apparatus for a customer to register an item for purchase. As shown in FIG. 1, the wireless tag reading apparatus 10 moves a pair of antennas 14 and 15 installed on a moving stage 18 along the Y-axis under a basket 13 in which an item 22 purchased by a customer is stored, which is placed on a placing table 12. The pair of antennas 14 and 15 are disposed below the placing table 12 along the X-axis. The pair of antennas 14 and 15 are inclined around the Y-axis toward the center line of a region where the basket 13 is placed. The basket 13 is placed at a predetermined position of the placing table 12, for example, inside a placing position marker 16 indicated on the placing table 12. A plurality of items 22 can be stored in the basket 13. The basket 13 is also referred to as a storage unit in the present disclosure. Note that the item 22 may be directly placed inside the placing position marker 16 of the placing table 12. That is, the basket 13 may not be provided.

As shown in FIG. 2, the moving stage 18 moves along a rail 21 in the Y-axis direction, that is, in the direction of the arrow A, by the rotational driving force of a driving motor 20.

The antenna 14 and the antenna 15 transmit radio waves (i.e., transmission waves) for reading tag information stored in an RFID tag 24 attached to the item 22 using time division multiplexing while moving in the Y-axis direction. The antenna 14 and the antenna 15 receive radio waves (i.e., response waves) from the RFID tag 24. The wireless tag reading apparatus 10 repeatedly transmits and receives such radio waves at predetermined time intervals.

Since the RFID tag 24 has directivity, the wireless tag reading apparatus 10 includes the two antennas 14 and 15, and transmits the transmitted waves from different orientations, so that it is possible to reliably detect the response waves from the RFID tag 24 regardless of the arrangement of the RFID tag 24 inside the basket 13. The number of antennas is not limited to two.

The RFID tag 24 is an example of a wireless tag in the present disclosure. The RFID tag 24 includes an antenna and receives the transmitted waves transmitted from the antennas 14 and 15 by short-range radio communication. In addition, the RFID tag 24 transmits the tag information stored in the storage medium of the RFID tag 24 as a response wave to the transmission wave. The RFID tag 24 stores the tag information in its memory. The tag information is, for example, an item code (for example, an electronic product code (EPC) capable of identifying the item 22 to which the RFID tag 24 is attached. The RFID tag 24 transmits such an item code or the like stored in the memory when receiving a radio wave for reading out the information stored in the memory from the antennas 14 and 15.

Above the placing table 12, as shown in FIG. 1, a monitoring camera 26 is installed to capture an image or video of the placing table 12. The monitoring camera 26 is an imaging device that monitors a range of the placing table 12 and its surroundings, for example, a range of an angle of view w in FIG. 1. The wireless tag reading apparatus 10 analyzes the image captured by the monitoring camera 26 while the antenna 14 and the antenna 15 are moving, and recognizes whether or not the basket 13, the item 22, or the person is moving. The details will be described later.

In order to prevent the signal wave environment from being disturbed by external foreign matters, the wireless tag reading apparatus 10 may include a shield for shielding the radio wave so as to surround the basket 13 on the placing table 12.

(Hardware Configuration of Wireless Tag Reading Apparatus)

Figure 3:
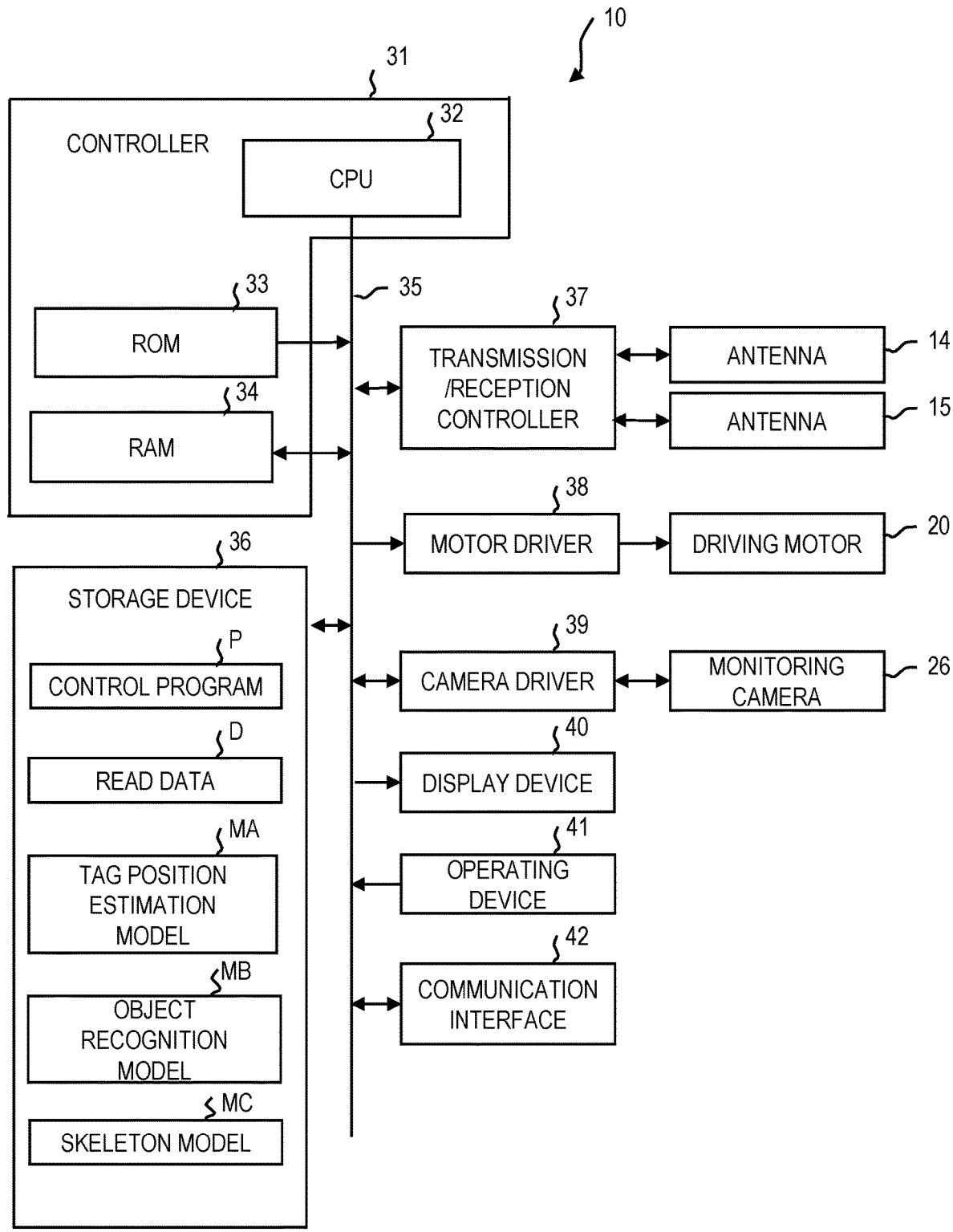
FIG. 3 is a hardware block diagram of the wireless tag reading apparatus.

A hardware configuration of the wireless tag reading apparatus 10 will be described with reference to FIG. 3. FIG. 3 is a hardware block diagram of the wireless tag reading apparatus 10 according to an embodiment.

The wireless tag reading apparatus 10 includes a controller 31 for controlling each unit of the wireless tag reading apparatus 10. The controller 31 includes a central processing unit (CPU) 32, a read only memory (ROM) 33, and a random access memory (RAM) 34. The CPU 32 is connected to the ROM 33 and the RAM 34 via an internal bus 35 such as an address bus and a data bus. The CPU 32 loads various programs stored in the ROM 33 and a storage device 36 onto the RAM 34. The CPU 32 controls the operation of the wireless tag reading apparatus 10 by executing various programs loaded onto the RAM 34.

The controller 31 is connected to a storage device 36, a transmission/reception controller 37, a motor driver 38, a camera driver 39, a display device 40, an operating device 41, and a communication interface 42 via the internal bus 35.

The controller 31 controls the transmission/reception controller 37, the antenna 14, and the antenna 15 to read the tag information stored in the RFID tag 24. In addition, the controller 31 may control the transmission/reception controller 37, the antenna 14, and the antenna 15 to write the tag information to the RFID tag 24.

The controller 31 acquires the information identifying the antennas 14 and 15, the time at which the response wave is received, the tag information such as the item code read from the RFID tag 24, the RSSI value, and the phase value in association with each other. The RSSI value represents the strength of the response wave received from the RFID tag 24. The phase value represents the phase difference between the transmitted wave and the response wave from the RFID tag 24. Based on the phase value, the distance between the antenna 14 and the RFID tag 24, or the distance between the antenna 15 and the RFID tag 24, can be estimated. The RSSI and phase values will be described in detail later (see FIG. 5B).

The storage device 36 includes a nonvolatile storage medium such as a hard disk drive (HDD) or a solid state drive (SSD). The storage device 36 stores various programs and various data related to the operation of the wireless tag reading apparatus 10.

The storage device 36 stores a control program P, read data D, a tag position estimation model Ma, an object recognition model Mb, and a skeleton model Mc.

The control program P is a program for operating the wireless tag reading apparatus 10.

The read data D is time-series data acquired from the RFID tags 24 read while the antennas 14 and 15 move. The contents of the read data D will be described in detail later (see FIG. 4).

The tag position estimation model Ma is a learning model that estimates the position of the RFID tag 24 that has transmitted the response wave. The tag position estimation model Ma is a software module that outputs the current position of the RFID tag 24 upon input of values representing the characteristics of a response wave from the RFID tag 24 (e.g., the RSSI value and phase value). The tag position estimation model Ma is generated by placing the RFID tag 24 that stores known tag information at a plurality of predetermined positions and reading the response wave by the wireless tag reading apparatus 10. The tag position estimation model Ma will be described in detail later (see FIG. 6).

The object recognition model Mb is a software module for recognizing the item 22 and the basket 13 from the images captured by the monitoring cameras 26.

The skeleton model Mc is a software module for detecting a skeleton of a person from the images captured by the monitoring camera 26.

The transmission/reception controller 37 controls the antenna 14 and the antenna 15 to transmit radio waves under the control of the controller 31.

The motor driver 38 controls the driving motor 20 that drives the moving stage 18. The motor driver 38 controls the driving motor 20 in accordance with the movement instruction of the antennas 14 and 15 output by the controller 31.

In response to an instruction from the controller 31, the camera driver 39 controls an imaging operation of the monitoring camera 26.

The display device 40 displays a screen generated by an instruction from the controller 31. The display device 40 is, for example, a liquid crystal display (LCD) display or an organic electro luminescence (EL) display.

The operating device 41 acquires an input operation of the operator and transmits a signal corresponding to the input operation to the controller 31. The operating device 41 includes, for example, an input device such as a touch panel or a keyboard.

The communication interface 42 is a communication interface controller for communicating with an external device such as a point-of-sale (POS) terminal or a store server (not shown) via a network or the like. The wireless tag reading apparatus 10 outputs the read result of the RFID tag 24 to such an external device.

(Description of Information Acquired by Wireless Tag Reading Apparatus)

Figure 4:
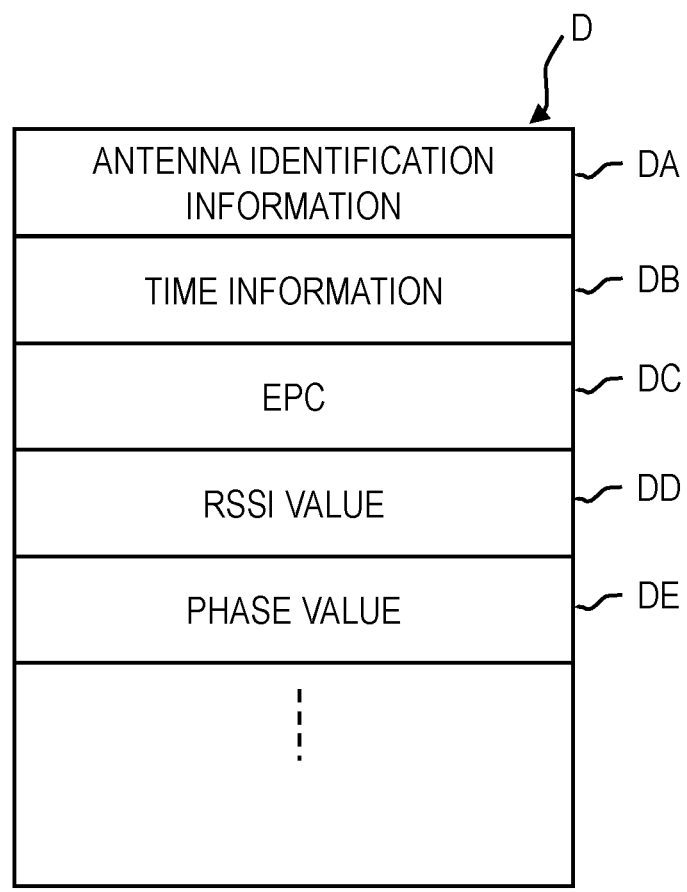
FIG. 4 is a diagram of information acquired from a radio frequency identification (RFID) tag by the wireless tag reading apparatus.

The read data D acquired from the RFID tag 24 by the wireless tag reading apparatus 10 will be described with reference to FIG. 4. FIG. 4 is a diagram illustrating an exemplary data structure of the read data D acquired from the RFID tag 24 by the wireless tag reading apparatus 10.

The read data D stores antenna identification information Da, time information db, an EPC Dc, an RSSI value Dd, and a phase value De in association with each other.

The antenna identification information Da identifies the antenna 14 or the antenna 15 through which the tag information has been received.

The time information db indicates the time at which the response wave of the RFID tag 24 is received. The time information db is clocked by the controller 31. Instead of the time information db, the position information indicating the position of the antenna 14 or the position of the antenna 15 when the response wave of the RFID tag 24 is received may be stored. The positions of the antennas 14 and 15 are specified, for example, by detecting that the moving stage 18 positioned at the predetermined home position has moved by the number of revolutions of the driving motor 20 in a direction defined by the rotation direction of the driving motor 20.

The EPC Dc is an item code that can identify the item 22. The EPC Dc is, for example, a Japanese article number (JAN) code.

The RSSI value Dd is a value representing the strength of the response wave returning from the RFID tag 24.

The phase value De is a value representing a phase difference between the transmitted wave and the response wave received from the RFID tag 24. The phase De varies between 0° and 359°. When the phase difference between the transmission wave and the response wave changes from 359° to 360°, the phase value indicates 0° again. Therefore, the phase value acquired by the wireless tag reading apparatus 10 is discontinuous between 359° and 0°. Therefore, the wireless tag reading apparatus 10 performs a process of correcting the acquired phase value. Specifically, when the phase value changes from 359° to 0°, the phase value after the change is corrected to 360°. When the phase value changes from 0° to 359°, the phase value after the change is corrected to −1°. As a result, the phase Df acquired by the wireless tag reading apparatus 10 has a property of continuously changing with time.

Note that the wireless tag reading apparatus 10 operates the reading process of the RFID tag 24 in a session 1 (S1), a session 2 (S2), or a session 3 (S3). Therefore, it is assumed that the RFID tag 24 that has responded once does not respond again for a predetermined period of time.

(Explanation of RSSI and Phase Values)

Figure 5A:
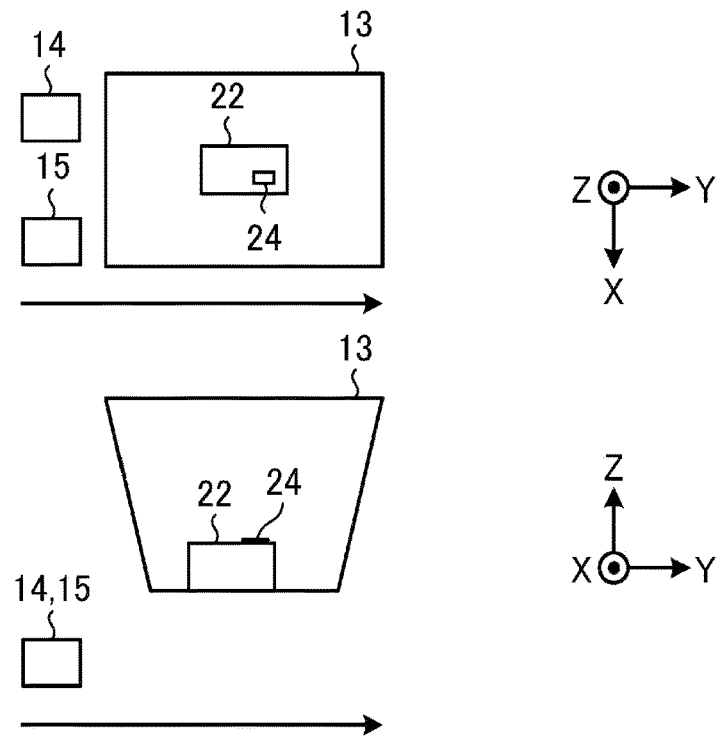
FIG. 5A is a top view and a side view of the wireless tag reading apparatus reading information from the RFID tag attached to an item in a basket.
Figure 5B:
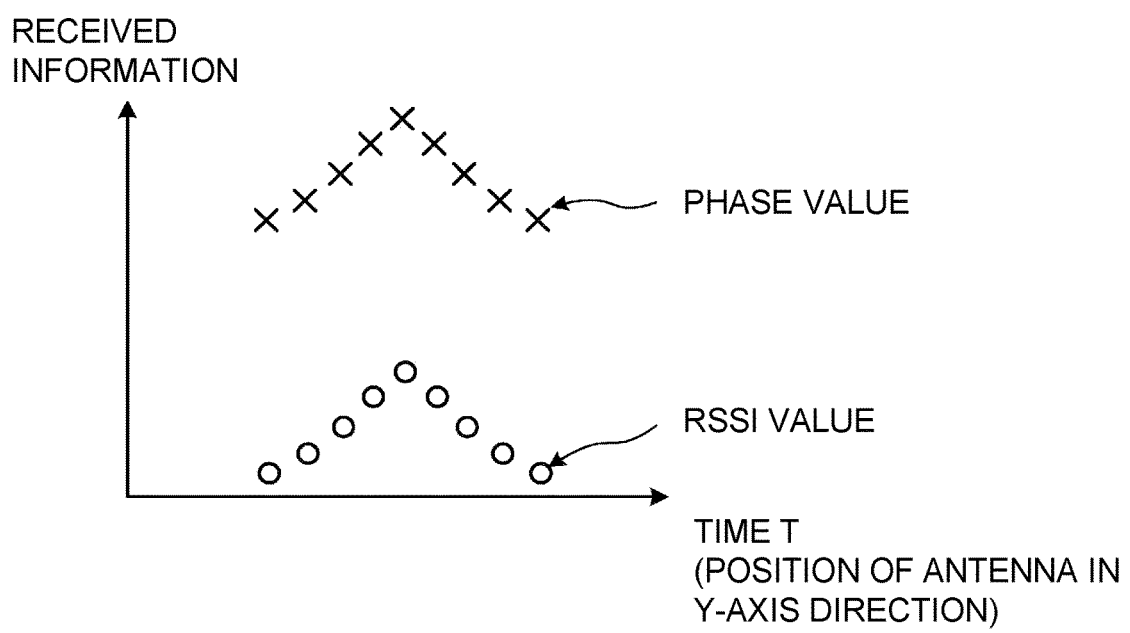
FIG. 5B depicts received signal strength indicator (RSSI) values and phase values.

The RSSI value Dd and the phase value Df acquired by the wireless tag reading apparatus 10 will be described with reference to FIGS. 5A and 5B. FIG. 5A is a top view and a side view of the wireless tag reading apparatus 10 that reads the tag information from the RFID tag 24 attached to the item 22 in the basket 13. FIG. 5B is a diagram for explaining the RSSI and phase values.

As shown in FIG. 5A, the wireless tag reading apparatus 10 transmits radio waves from the antennas 14 and 15 toward the basket 13 in a time-division manner while moving the antenna 14 and the antenna 15 along the Y-axis below the basket 13 placed at the predetermined position. Then, the antenna 14 and the antenna 15 receive a response wave from the RFID tag 24 attached to the item 22 to the transmission wave transmitted by themselves.

Since the transmitting of the radio wave and the receiving of the response wave are executed at predetermined time intervals while the antennas 14 and 15 are moving, the wireless tag reading apparatus 10 acquires time-series data of the RSSI and phase values shown in FIG. 5B.

The horizontal axis of FIG. 5B represents the time t at which the wireless tag reading apparatus 10 acquires the response wave. Further, the horizontal axis in FIG. 5B may be considered to indicate the Y-axis position of the antennas 14 and 15.

The time series of the RSSI values indicate larger values as the antenna 14 or the antenna 15 is positioned closer to the RFID tag 24 that has transmitted the response wave. In addition, the time series of the RSSI values indicate smaller values as the antenna 14 or the antenna 15 is located at a position farther from the RFID tag 24 that has transmitted the response wave. Therefore, as shown in FIG. 5B, the RSSI value is larger as the antennas 14 and 15 are located closer to the basket 13.

The time series data of the phase value indicates a value corresponding to the distance between the antenna 14 or the antenna 15 and the RFID tag 24 that has transmitted the response wave. As shown in FIG. 5B, the closer the antenna 14 or the antenna 15 is to the RFID tag 24, the larger the phase value is. Note that the phase values shown in FIG. 5B are obtained by correcting the discontinuously changing phase values so as to be continuously changed.

(Explanation of how to Estimate the Position of RFID Tag)

Figure 6:
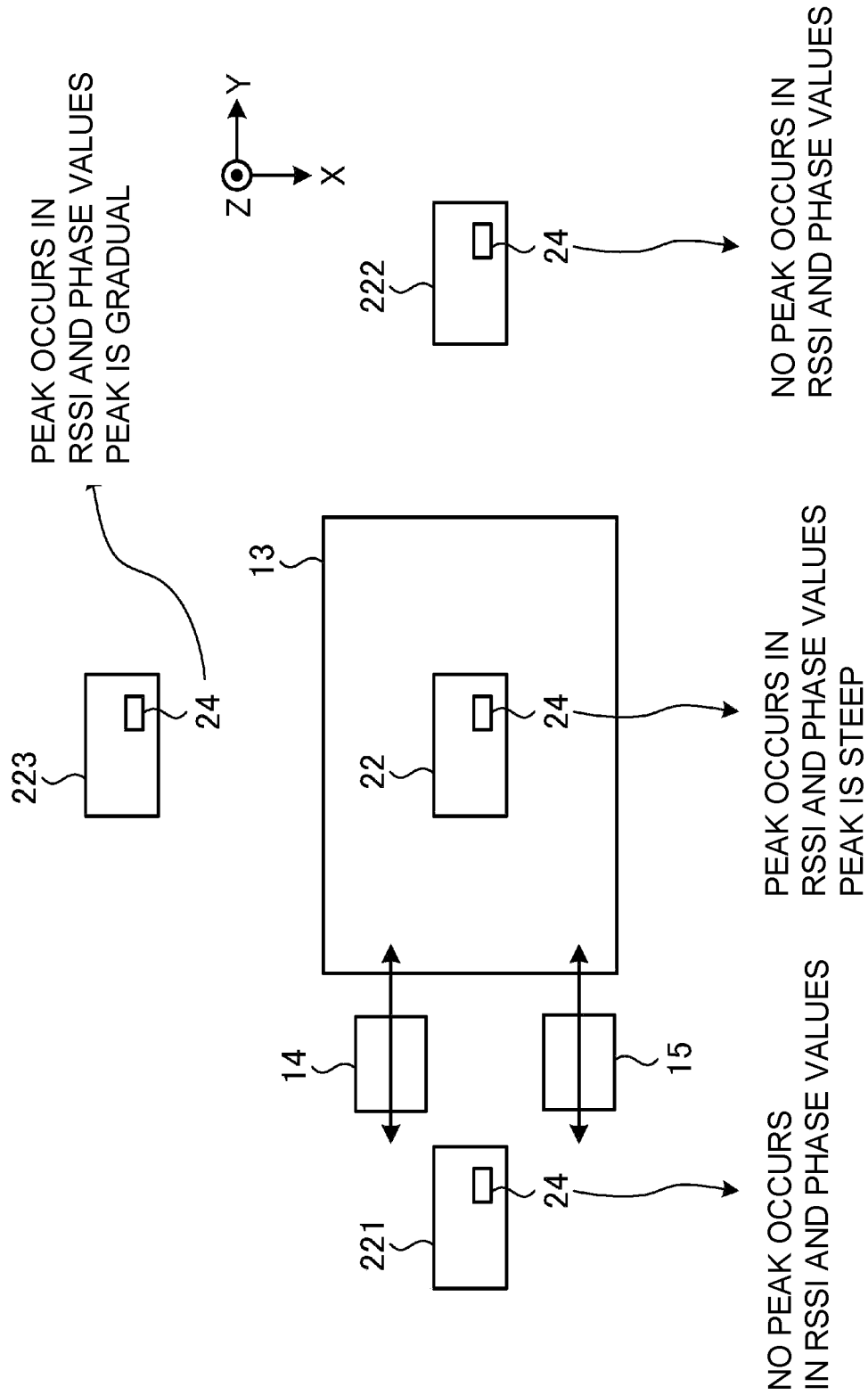
FIG. 6 depicts how to determine whether an RFID tag is inside or outside a basket.

With reference to FIG. 6, how the wireless tag reading apparatus 10 estimates the position of the RFID tag 24 will be described. FIG. 6 is a diagram for explaining how to determine whether the RFID tag 24 is inside or outside the basket 13.

The time-series change pattern of the RSSI value and the phase value (refer to FIG. 5B) acquired by the wireless tag reading apparatus 10 corresponds to approximately one-to-one with the presence position of the RFID tag 24. FIG. 6 shows an outline of a time-series variation pattern of the RSSI and phase values acquired by the wireless tag reading apparatus 10 when the same the RFID tag 24 is placed at a plurality of positions inside and outside the basket 13.

When the item 22 to which the RFID tag 24 is attached is inside the basket 13, the time-series change pattern of the RSSI value and the phase value acquired by the wireless tag reading apparatus 10 exhibits a property of having a steep peak in both the RSSI value and the phase value, as shown in FIG. 5B.

It is assumed that an item 221 with an RFID tag 24 is located outside the basket 13 at a position in the X-axis direction same as the item 22 but at a position in the Y-axis direction being offset to the negative side from the item 22. Here, the antenna-series variation pattern of RSSI value and the phase value acquired by the wireless tag reading apparatus 10 indicates that both RSSI value and the phase value monotonically decrease as the antennas 14 and 15 move toward the Y-axis positive side. Then, no peak occurs in the RSSI value and the phase value.

It is assumed that an item 222 with an RFID tag 24 is located outside the basket 13 at a position in the X-axis direction same as the item 22 but at a position in the Y-axis direction being offset to the positive side from the item 22. Here, the antenna-series variation pattern of the RSSI value and the phase value acquired by the wireless tag reading apparatus 10 indicates that both the RSSI value and the phase value monotonically increase as the antennas 14 and 15 move toward the Y-axis positive side. Then, no peak occurs in the RSSI value and the phase value.

It is assumed that an item 223 with an RFID tag 24 is located outside the basket 13 at a position in the Y-axis direction same as the item 22 but at a position in the X-axis direction being offset to the negative side from the item 22. In this case, the time-series change pattern of the RSSI value and the phase value acquired by the wireless tag reading apparatus 10 has peaks in both the RSSI value and the phase value, but indicates that the peak generated becomes more gradual than when the RFID tag 24 is inside the basket 13.

As described above, the time-series change pattern of RSSI and phase values acquired by the wireless tag reading apparatus 10 corresponds to the position of the RFID tag 24 approximately one-to-one. The tag position estimation model Ma stored in the wireless tag reading apparatus 10 is a model in which a time-series change pattern of a plurality of RSSI values and phase values acquired from each of the RFID tags 24 placed at a plurality of known positions is stored in association with the placement positions of the tag 24. The tag position estimation model Ma is learned so that the estimated position of the RFID tag 24 is output when the time-series change pattern of the RSSI value and the phase value is input.

(Description of Method for Detecting Movement of Basket, Item, or Person)

Figure 7:
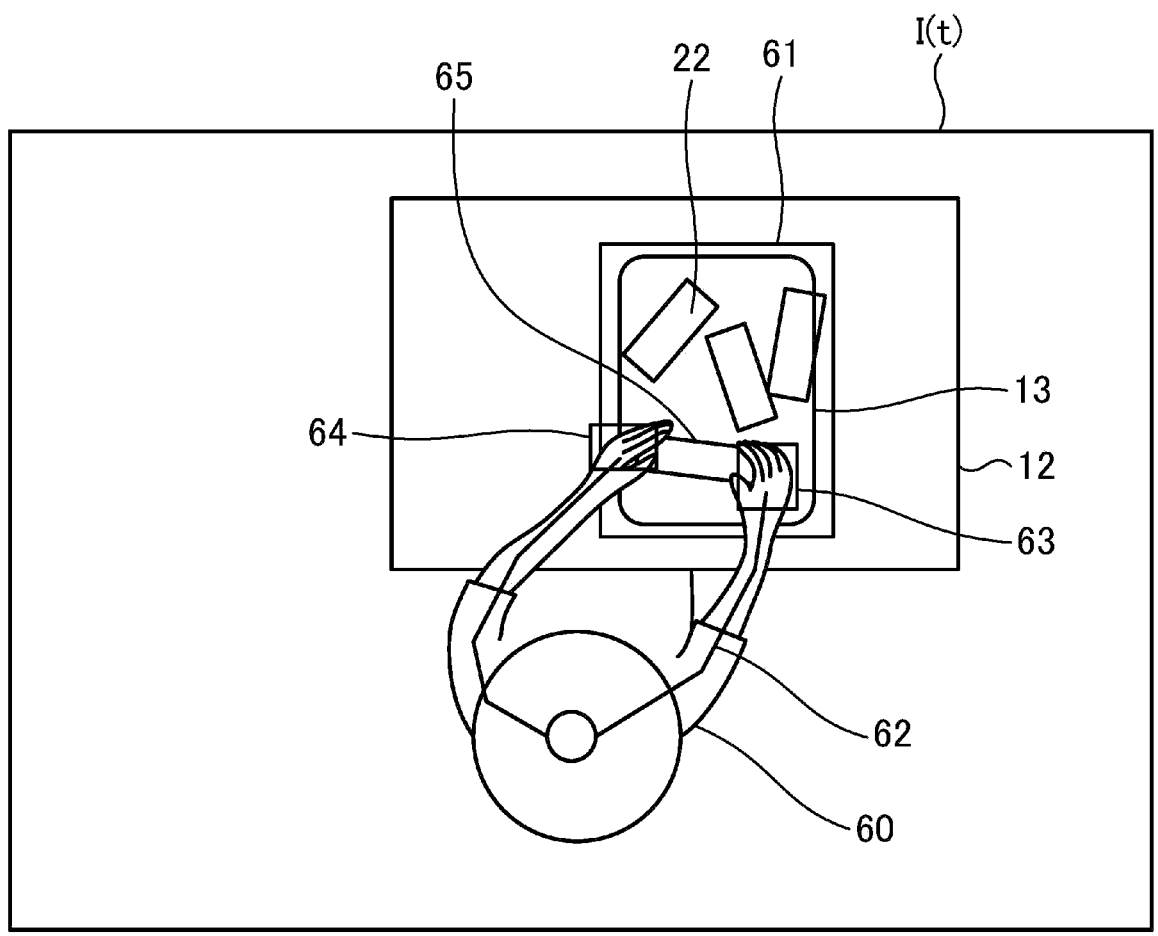
FIG. 7 depicts a method of recognizing whether a basket, an item, or a person is moving from an image captured by a monitoring camera.

With reference to FIG. 7, a method of detecting movement of the basket 13, the item 22, and a person 60 such as a customer by the wireless tag reading apparatus 10 will be described. FIG. 7 is a diagram for explaining a method of recognizing whether the basket 13, the item 22, or the person 60 is moving from an image captured by the monitoring camera 26.

The monitoring camera 26 captures the monitoring image I(t) as shown in FIG. 7 at predetermined time intervals at least while the wireless tag reading apparatus 10 is transmitting radio waves. In the monitoring image I(t), the person 60 in the vicinity of the basket 13, the placing table 12, the basket 13, and the item 22 are shown.

The wireless tag reading apparatus 10 detects the person 60, the basket 13, and the item 22 in the monitoring image I(t) by performing predetermined image processing on the monitoring image I(t).

The wireless tag reading apparatus 10 detects the person 60 from the monitoring image I(t) by using, for example, a skeleton detection method using known deep learning. Subsequently, the posture of the person 60 detected in the person detection process is estimated by utilizing a technique of detecting skeletal data of the person called posture estimation. The estimated posture of the person 60 is recognized as the skeleton 62 shown in FIG. 7. The wireless tag reading apparatus 10 tracks the detected person 60 with respect to the monitoring image I(t) captured at predetermined time intervals. Accordingly, the wireless tag reading apparatus 10 determines whether or not the detected person 60 is moving. In particular, when an operation of moving a hand shadowed on the placing table 12 is detected, there is a possibility that the reading result of the RFID tag 24 is affected, and thus the wireless tag reading apparatus 10 outputs a notification.

Note that the tracking process of the person 60 can be realized, for example, by performing image classification using deep learning. Specifically, at least one feature of the person 60 is detected by using, for example, convolutional layers of convolutional neural network (CNN) as feature detector. Then, by comparing the feature amounts calculated from the different monitoring images I(t) with each other using the nearest neighbor method or the like, it is possible to determine whether or not the person is the same person and to track the same person.

Further, the wireless tag reading apparatus 10 detects the basket 13 in the monitoring image I(t). Since the shape and size of the basket 13 as viewed from directly above are determined, the wireless tag reading apparatus 10 performs a process of detecting a region having a known shape and size from the monitoring image I(t). Alternatively, the basket 13 may be detected by performing template matching using an image viewed from directly above the basket 13 as a template. For example, as shown in FIG. 7, a basket position 61 may be drawn at the detected position of the basket 13.

The wireless tag reading apparatus 10 tracks the detected basket 13 with respect to the monitoring image I(t) captured at predetermined time intervals. The tracking process can be performed in the same manner as the tracking of the person 60 described above. Accordingly, the wireless tag reading apparatus 10 determines whether or not the detected basket 13 is moving. When it is detected that the basket 13 is moving, there is a possibility that the reading result of the RFID tag 24 is affected, and thus the wireless tag reading apparatus 10 outputs a notification.

Further, the wireless tag reading apparatus 10 detects the item 22 by, for example, performing object recognition on the monitoring image I(t). Further, the wireless tag reading apparatus 10 tracks the detected item 22 with respect to the monitoring image I(t) captured at predetermined time intervals. The tracking process can be performed in the same manner as the tracking of the person 60 described above. Accordingly, the wireless tag reading apparatus 10 determines whether or not the detected item 22 is moving. For example, by cooperating with the posture estimation described above, it is also possible to detect the person 60 grasping and moving an item 65 with the right hand 63 and the left hand 64.

Note that the wireless tag reading apparatus 10 may include a distance measuring sensor (not shown) in addition to the monitoring camera 26. The ranging sensor is, for example, a time of flight (TOF) sensor or the like. In addition to the monitoring image I(t), the wireless tag reading apparatus 10 may also use the distance information acquired by the distance measurement sensor to recognize the movement of the basket 13, the item 22, or the person 60.

In addition, the movement of the basket 13 may be detected by, for example, incorporating a weight sensor in the placing table 12 and monitoring a variation in the output of the weight sensor. That is, when the output of the weight sensor fluctuates while the wireless tag reading apparatus 10 is transmitting radio waves, it may be determined that the basket 13 has moved.

When the movement of the basket 13, the item 22, or the person 60 occurs while the wireless tag reading apparatus 10 is reading the RFID tag 24, there is a possibility that the position of the RFID tag 24 cannot be accurately estimated because the RSSI value Dd and the phase value De acquired by the wireless tag reading device 10 from the RFID tag 24 fluctuate. Therefore, the wireless tag reading apparatus 10 outputs a notification when the movement of the basket 13, the item 22, or the person 60 occurs while the RFID tag 24 is being read.

(Method of Notifying that there has been Movement of Basket, Item, or Person)

Figure 8:
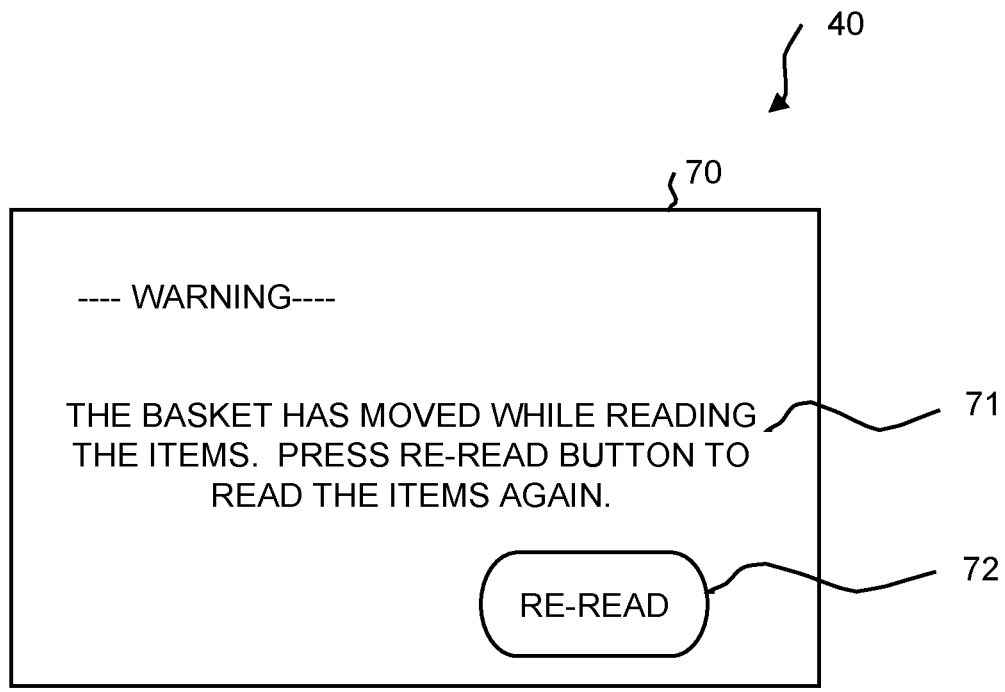
FIG. 8 depicts a notification output by the wireless tag reading apparatus.

With reference to FIG. 8, a notification process performed when the movement of the basket 13, the item 22, or the person 60 is detected while the wireless tag reading apparatus 10 is reading the RFID tag 24 will be described. FIG. 8 is a diagram illustrating an example of the notification method performed by the wireless tag reading apparatus 10 according to an embodiment.

When the movement of the basket 13, the item 22, or the person 60 is detected during the reading of the RFID tag 24, the wireless tag reading apparatus 10 displays a warning screen 70 on the display device 40 (see FIG. 3).

The warning screen 70 includes a message 71 and a re-read button 72. The message 71 indicates that the movement of the basket 13, the item 22, or the person 60 has been detected during the reading of the RFID tag 24. The re-read button 72 is a button for instructing the wireless tag reading apparatus 10 to re-read the RFID tag 24.

Note that the notification method is not limited to the example of FIG. 8. For example, a voice message may be output from a speaker not shown in FIG. 3.

Further, although not illustrated in FIG. 8, in a case where the movement of the basket 13, the item 22, or the person 60 is detected, the wireless tag reading apparatus 10 may display a message prompting the customer to use another reading apparatus such as a bar code reader to read the item 22 again on the warning screen 70.

In addition, when the movement of the basket 13, the item 22, or the person 60 is detected, the wireless tag reading apparatus 10 may display the identification information acquired from the RFID tag 24 on the display device 40 on the warning screen 70 so that the customer can confirm whether the read information is correct.

(Functional Configuration of Wireless Tag Reading Apparatus)

Figure 9:
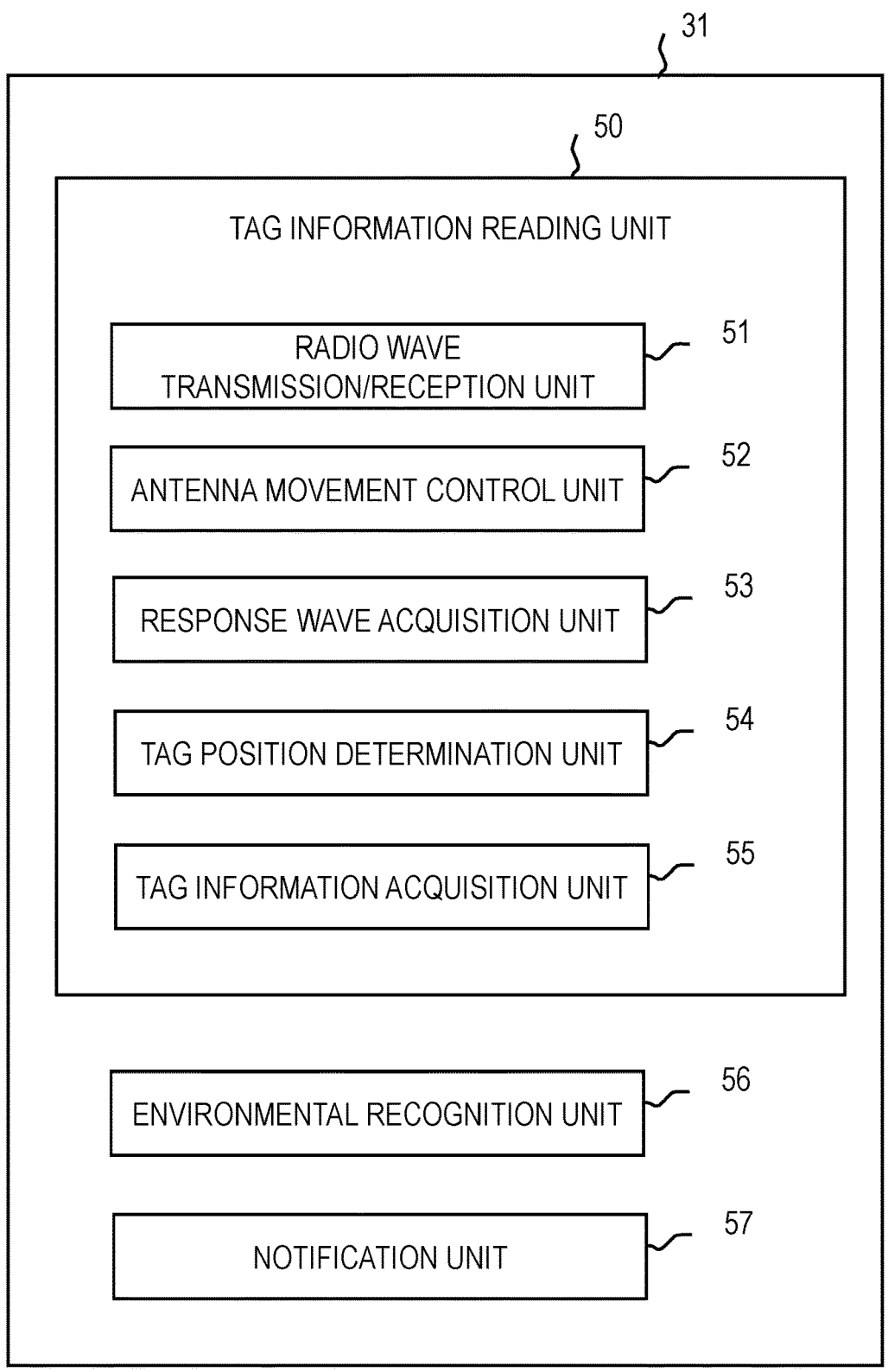
FIG. 9 is a functional block diagram of the wireless tag reading apparatus.

A functional configuration of the wireless tag reading apparatus 10 will be described with reference to FIG. 9. FIG. 9 is a functional block diagram of the wireless tag reading apparatus 10 according to an embodiment.

The controller 31 of the wireless tag reading apparatus 10 executes the control program P loaded onto the RAM 34, thereby operating as a tag information reading unit 50, an environment recognition unit 56, and a notification unit 57 illustrated in FIG. 9.

The tag information reading unit 50 controls, through the transmission/reception controller 37, the antennas 14 and 15 to transmit radio waves to the RFID tag 24 and receive response waves therefrom. The tag information reading unit 50 determines whether the RFID tag 24 is located in a predetermined area (i.e., inside the basket 13) based on the detected response wave. Further, the tag information reading unit 50 acquires the tag information stored in the RFID tag 24 from the response wave from the RFID tag 24. The tag information reading unit 50 includes a radio wave transmission/reception unit 51, an antenna movement control unit 52, a response wave acquisition unit 53, a tag position determination unit 54, and a tag information acquisition unit 55.

The radio wave transmission/reception unit controls the antennas 14 and 15 to transmit a radio wave and receives a response wave from the RFID tag 24.

The antenna movement control unit 52 controls, through the motor driver 38, the driving motor 20 to move the moving stage 18 to change the position of the radio wave transmission/reception unit 51 with time.

The response wave acquisition unit 53 acquires an RSSI value and a phase value from the response wave received by the radio wave transmission/reception unit 51 that is moved by the antenna movement control unit 52 as a time-series signal.

The tag position determination unit 54 determines whether the time-series signal resulting in the RSSI value and the phrase value acquired by the response wave acquisition unit 53 is a response wave from the RFID tag 24 attached to the item 22 stored in the basket 13 placed at the predetermined position.

The tag information acquisition unit 55 acquires the tag information stored in the RFID tag 24 from the response wave on condition that the tag position determination unit 54 determines that the time-series signal is a response wave from the RFID tag 24 attached to the item 22 stored in the basket 13 placed at the predetermined position.

The environment recognition unit 56 detects at least movement of the basket 13 or movement of the item 22 while the radio wave is being transmitted under the control of the radio wave transmission/reception unit 51, based on the images captured by the monitoring camera 26. The environment recognition unit 56 further detects movement of the person 60 in the vicinity of the basket 13 based on the images.

The notification unit 57 performs notification on condition that the environment recognition unit 56 detects at least the movement of the basket 13 or the movement of the item 22 while the radio wave is being transmitted under the control of the radio wave transmission/reception unit 51.

Further, the notification unit 57 may performs notification by prompting the customer to read the item 22 again by another reading device on condition that the environment recognition unit 56 detects at least the movement of the basket 13 or the movement of the item 22 while the radio wave is being transmitted under the control of the radio wave transmission/reception unit 51. The other reading device is, for example, a barcode reader that reads a barcode attached to the item 22. Further, in the wireless tag reading apparatus 10, the RFID tag 24 attached to the item 22 may be re-read by the antennas 14 and 15 that have been moved to predetermined positions.

Further, the notification unit 57 may control the display device 40 to display the identification information acquired by the tag information acquisition unit 55 on condition that the environment recognition unit 56 detects at least the movement of the basket 13 or the movement of the item 22 while the radio wave is being transmitted under the control of the radio wave transmission/reception unit 51 and prompt the customer to confirm the identification information.

(Flow of Processing Performed by Wireless Tag Reading Apparatus)

Figure 10:
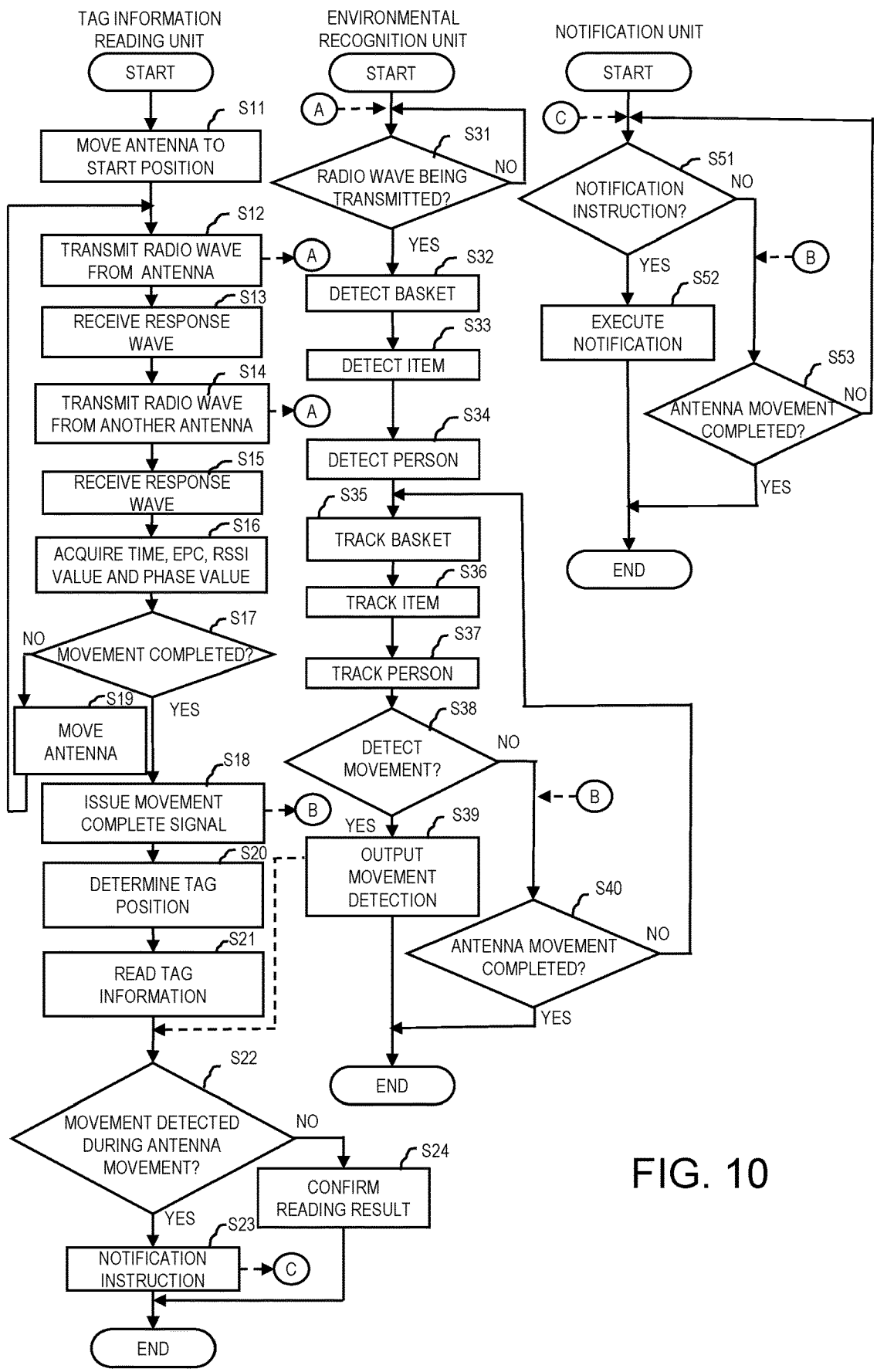
FIG. 10 is a flowchart of processing performed by the wireless tag reading apparatus.

The flow of processing performed by the wireless tag reading apparatus 10 will be described with reference to FIG. 10. FIG. 10 is a flowchart of the processing performed by the wireless tag reading apparatus 10 according to an embodiment.

First, the flow of processing performed by the tag information reading unit 50 will be described. First, the antenna movement control unit 52 controls the motor driver 38 to move the moving stage 18 such that the antennas 14 and 15 are located at the start position (step S11).

The radio wave transmission/reception unit 51 controls the transmission/reception controller 37 to transmit radio waves from one antenna (for example, the antenna 14) (step S12).

The radio wave transmission/reception unit 51 controls the transmission/reception controller 37 to receive a response wave (step S13).

The radio wave transmission/reception unit 51 controls the transmission/reception controller 37 to transmit radio waves from the other antenna (e.g., the antenna 15) (step S14).

The radio wave transmission/reception unit 51 controls the transmission/reception controller 37 to receive a response wave (step S15).

The response wave acquisition unit 53 acquires the time at which the response wave is received, the EPC the RSSI value, and the phase value from the response wave (step S16).

The antenna movement control unit 52 determines whether the movement of the antennas 14 and 15 is completed (step S17). If it is determined that the moving of the antennas 14 and 15 has been completed (step S17: Yes), the process proceeds to step S18. On the other hand, if it is not determined that the movements of the antennas 14 and 15 have been completed (step S17: No), the process proceeds to step S19.

In the step S17, if it is not determined that the movement of the antennas 14 and 15 has been completed, the antenna movement control unit 52 controls the motor driver 38 to move the moving stage 18 such that the antennas 14 and 15 are moved by a predetermined amount (step S19). Thereafter, the process returns to S12, and the above-described process is repeated.

On the other hand, when it is determined in the step S17 that the movement of the antennas 14 and 15 has been completed, the antenna movement control unit 52 issues, to the environment recognition unit 56, an antenna movement completion signal indicating that the movement of the antennas 14 and 15 has been completed (step S18).

The tag position determination unit 54 determines whether or not the RFID tag 24 that has transmitted the response wave is inside the basket 13 based on the RSSI value and the phase value acquired in the step S16 (step S20).

Subsequently, in the step S20, the tag information acquisition unit 55 reads EPC acquired from the RFID tag 24 for the RFID tag 24 determined to be inside the basket 13 (step S21).

Next, the tag information reading unit 50 determines whether the movement of the basket 13, the item 22, or the person 60 has been detected while the reading is being performed (step S22). When it is determined that the moving of the basket 13, the item 22, or the person 60 has been detected (step S22: Yes), the process proceeds to step S23. On the other hand, if it is not determined that the movements of the basket 13, the item 22, or the person 60 have been detected (step S22: No), the process proceeds to step S24.

In the step S22, when it is determined that the moving of the basket 13, the item 22, or the person 60 is detected, the tag information reading unit 50 issues a notification instruction to instruct the notification unit 57 to execute notification (step S23). Thereafter, the tag information reading unit 50 ends the processing of FIG. 10.

On the other hand, if it is not determined in the step S22 that the movement of the basket 13, the item 22, or the person 60 has been detected, the tag information acquisition unit 55 confirms the information read in the step S21 (step S24). Thereafter, the tag information reading unit 50 ends the processing of FIG. 10. The determined reading is transmitted to a POS terminal, a higher-level server, or the like, for checkout processing of the item.

Next, the flow of processing performed by the environment recognition unit 56 will be described. First, the environment recognition unit 56 determines whether the radio wave is being transmitted under the control of the radio wave transmission/reception unit 51 (step S31). When it is determined that the radio wave is being transmitted (step S31: Yes), the process proceeds to step S32. On the other hand, if it is not determined that the radio wave is being transmitted (step S31: No), the determination of the step S31 is repeated.

In the step S31, when it is determined that the radio wave is being transmitted, the environment recognition unit 56 detects the basket 13 in the monitoring images I(t) captured by the monitoring camera 26 (step S32).

In addition, the environment recognition unit 56 detects the item 22 in the monitoring images I(t) (step S33).

Furthermore, the environment recognition unit 56 detects the person 60 in the monitoring images I(t) (step S34).

The environment recognition unit 56 tracks the basket 13 detected in the step S32 from among the plurality of monitoring images I(t) captured over time (step S35).

In addition, the environment recognition unit 56 tracks the item 22 detected in the step S33 from among the plurality of monitoring images I(t) captured over time (step S36).

Furthermore, the environment recognition unit 56 tracks the person 60 detected in the step S34 from among the plurality of monitoring images I(t) captured over time (step S37).

The environment recognition unit 56 determines whether the movement of the basket 13, the item 22, or the person 60 has been detected based on the tracking of the basket 13, the item 22, and the person 60 (step S38). When it is determined that the moving of the basket 13, the item 22, or the person 60 has been detected (step S38: Yes), the process proceeds to step S39. On the other hand, if it is not determined that the movements of the basket 13, the item 22, or the person 60 have been detected (step S38: No), the process proceeds to step S40.

In the step S38, when it is determined that the movement of the basket 13, the item 22, or the person 60 has been detected, the environment recognition unit 56 notifies the tag information reading unit 50 that the movement of the basket 13, the item 22, or the person 60 has been detected (step S39). Thereafter, the environment recognition unit 56 ends the processing of FIG. 10.

In the step S38, if it is not determined that the movement of the basket 13, the item 22, or the person 60 has been detected, the environment recognition unit 56 determines whether or not any antenna movement completion signal indicating that the movement of the antennas 14 and 15 has been completed has been issued from the antenna movement control unit 52 (step S40). When it is determined that the antenna movement completion signal has been issued (step S40: Yes), the environmental recognition unit 56 ends the process of FIG. 10. On the other hand, if it is not determined that the antenna movement completion signal has been acquired (step S40: No), the process returns to step S35, and the above-described process is repeated.

Next, the flow of processing performed by the notification unit 57 will be described. First, the notification unit 57 determines whether the notification instruction has been issued by the tag information reading unit 50 (step S51). When it is determined that the notification instruction has been issued by the tag information reading unit 50 (step S51: Yes), the process proceeds to step S52. On the other hand, if it is not determined that the notification instruction has been issued by the tag information reading unit 50 (step S51: No), the process proceeds to step S53.

When it is determined in the step S51 that the notification instruction has been issued by the tag information reading unit 50, the notification unit 57 performs notification such as displaying the warning screen 70 illustrated in FIG. 8 (step S52). After that, the notification unit 57 ends the processing of FIG. 10.

On the other hand, if it is not determined in the step S51 that the notification instruction has been issued by the tag information reading unit 50, the notification unit 57 determines whether or not the antenna movement completion signal indicating that the movement of the antennas 14 and 15 has been completed has been issued by the antenna movement control unit 52 (step S53). When it is determined that the antenna movement completion signal has been issued (step S53: Yes), the notification unit 57 ends the process of FIG. 10. On the other hand, if it is not determined that the antenna movement completion signal has been issued (step S53: No), the process returns to step S51, and the above-described process is repeated.

Operation and Effect

As described above, the wireless tag reading apparatus 10 comprises the radio wave transmission/reception unit 51 which controls the transmission of radio waves and reception of the response waves from the RFID tag 24 over time, the response wave acquisition unit 53 which acquires some values from the response waves, the tag position determination unit 54 which judges whether such values are acquired from the RFID tag 24 attached to the item 22 placed in the basket 13 to be placed at the predetermined position, and the tag information acquisition unit 55 for acquiring the tag information stored in the RFID tag 24 from the response wave on condition that the item 22 is placed in the basket 13. The wireless tag reading apparatus 10 further comprises the environment recognition unit 56 that detects movement of the basket 13 or movement of the item 22, and a notification unit 57 that performs notification on condition that the environment recognition unit 56 detects movement of the basket 13 or the item 22 while the radio waves are being transmitted under the control of the radio wave transmission/reception unit 51. Therefore, when there is an external factor that affects the reading of the RFID tag 24, a notification can be made. The environment recognition unit 56 may further detect movement of the person 60 while the radio waves are being transmitted under the control of the radio wave transmission/reception unit 51.

Further, the wireless tag reading apparatus 10 can acquire the identification information for identifying the item 22 stored in the RFID tag 24, the RSSI value Dd of the response wave, and the phase value De of the response wave. Therefore, it is possible to acquire information related to the current position of the item 22 and another item potentially placed outside the basket 13.

Further, the wireless tag reading apparatus 10 includes the notification unit 57 for prompting the customer to use another reading apparatus to read the item 22 again on condition that the environment recognition unit 56 detects the movement of the basket 13 or the item 22 while the radio waves are being transmitted. Therefore, when the reliability of the reading result is low, it is possible to prompt the customer to perform the reading again using another reading device.

Further, the notification unit 57 further controls the display device 40 to display the identification information acquired by the tag information acquisition unit 55 on condition that the environment recognition unit 56 detects the movement of the basket 13 or the item 22 while the radio waves are being transmitted, and prompts the customer to confirm the reading result. Therefore, when the reliability of the reading result is low, it is possible to prompt the customer to confirm the reading result.

Further, the environment recognition unit 56 detects movement of the basket 13 or the item 22 based on the image captured by the monitoring camera 26 or the distance information measured by the distance measurement sensor. Therefore, movement of the basket 13 and the item 22 can be easily detected.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A wireless tag reading apparatus for reading tag information stored in a wireless tag attached to an item, comprising:
a stage on which the item can be placed;
one or more antennas movable between first and second positions;
a camera facing the stage; and
a controller configured to:
control the camera to capture images and detect an object therein,
control the antennas to transmit radio waves to a wireless tag and move the antennas, wherein the transmitting and the moving are repeated while the antennas move from the first position to the second position during a tag reading period,
acquire tag information from response waves transmitted by the wireless tag in response to the radio waves,
based on the captured images, determine whether the object has moved during the tag reading period, and
upon determining that the object has moved during the tag reading period, issue a notification.

2. The wireless tag reading apparatus according to claim 1, further comprising:
a display device, wherein
the controller is configured to, after issuing the notification, control the display device to display a screen indicating that the object has moved during the tag reading period.

3. The wireless tag reading apparatus according to claim 2, wherein the screen includes a message indicating that the wireless tag should be read again.

4. The wireless tag reading apparatus according to claim 2, wherein
the tag information indicates an item code of an item to which the wireless tag is attached, and
the screen displays the item code.

5. The wireless tag reading apparatus according to claim 1, further comprising:
a communication interface, wherein
the controller is configured to control the communication interface to transmit the tag information to a self-service point of sale (POS) terminal for item registration.

6. The wireless tag reading apparatus according to claim 1, wherein
the controller is configured to:
acquire first values indicating strengths of the response waves,
acquire second values indicating phase differences between the radio waves and the corresponding response waves, and
determine whether an item to which the wireless tag is attached is on the stage based on variations of the first values and the second values.

7. The wireless tag reading apparatus according to claim 1, wherein the antennas include a first antenna extending along a first direction parallel to the stage and a second antenna extending along a second direction crossing the first direction and parallel to the stage.

8. The wireless tag reading apparatus according to claim 7, wherein each of the first and second antennas has a surface facing and inclined with respect to a bottom surface of the stage.

9. The wireless tag reading apparatus according to claim 1, wherein the camera is installed above the stage.

10. The wireless tag reading apparatus according to claim 1, wherein the object is an item, a basket, or a person that is present on or around the stage.

11. A method carried out by a wireless tag reading apparatus for reading tag information stored in a wireless tag attached to an item, the reading apparatus including:
    a stage on which the item can be placed,
    one or more antennas movable between first and second positions, and
    a camera facing the stage, the method comprising:
    controlling the camera to capture images and detecting an object therein;
    controlling the antennas to transmit radio waves to a wireless tag and move the antennas, wherein the transmitting and the moving are repeated while the antennas move from the first position to the second position during a tag reading period;
    acquiring tag information from response waves transmitted by the wireless tag in response to the radio waves;
    based on the captured images, determining whether the object has moved during the tag reading period; and
    upon determining that the object has moved during the tag reading period, issuing a notification.

12. The method according to claim 11, further comprising:
    after the notification is issued, displaying a screen indicating that the object has moved during the tag reading period.

13. The method according to claim 12, wherein the screen includes a message indicating that the wireless tag should be read again.

14. The method according to claim 12, wherein
    the tag information indicates an item code of an item to which the wireless tag is attached, and
    the screen displays the item code.

15. The method according to claim 11, further comprising:
    transmitting the tag information to a point of sale (POS) terminal for item registration.

16. The method according to claim 11, further comprising:
    acquiring first values indicating strengths of the response waves;
    acquiring second values indicating phase differences between the radio waves and the corresponding response waves; and
    determining whether an item to which the wireless tag is attached is on the stage based on variations of the first values and the second values.

17. The method according to claim 11, wherein the antennas include a first antenna extending along a first direction parallel to the stage and a second antenna extending along a second direction crossing the first direction and parallel to the stage.

18. The method according to claim 17, wherein each of the first and second antennas has a surface facing and inclined with respect to a bottom surface of the stage.

19. The method according to claim 11, wherein the camera is installed above the stage.

20. A non-transitory computer readable medium storing a program causing a computer to execute a method for reading tag information stored in a wireless tag attached to an item, the method comprising:
    controlling a camera facing a stage on which the item can be placed to capture images and detecting an object therein;
    controlling one or more antennas movable between first and second positions to transmit radio waves to a wireless tag and move the antennas, wherein the transmitting and the moving are repeated while the antennas move from the first position to the second position during a tag reading period;
    acquiring tag information from response waves transmitted by the wireless tag in response to the radio waves;
    based on the captured images, determining whether the object has moved during the tag reading period; and
    upon determining that the object has moved during the tag reading period, issuing a notification.

* * * * *